(12) United States Patent
Chen

(10) Patent No.: US 6,697,896 B1
(45) Date of Patent: Feb. 24, 2004

(54) METHOD AND APPARATUS FOR IMPLEMENTING HIGH SPEED SIGNALS USING DIFFERENTIAL REFERENCE SIGNALS

(75) Inventor: Feng Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,614

(22) Filed: Dec. 31, 1999

(51) Int. Cl.[7] ............................................. G06F 13/00
(52) U.S. Cl. ...................................................... 710/100
(58) Field of Search .......................... 710/100; 375/257, 375/377, 259; 326/86, 39, 45, 81, 90

(56) References Cited

U.S. PATENT DOCUMENTS

| | | | | |
|---|---|---|---|---|
| 5,220,211 A | * | 6/1993 | Christopher et al. ......... | 326/90 |
| 5,818,261 A | * | 10/1998 | Perner .......................... | 326/86 |
| 6,154,498 A | * | 11/2000 | Dabral et al. ................ | 375/257 |
| 6,282,138 B1 | * | 8/2001 | Wilkins ....................... | 365/207 |

* cited by examiner

*Primary Examiner*—Xuan M. Thai
(74) *Attorney, Agent, or Firm*—Blakely, Sokoloff, Taylor & Zafman LLP

(57) ABSTRACT

A device contains a first device and a second device. In one embodiment, the first device drives at least three signals, a first reference signal, and a second reference signal. The second device, which is coupled to the first device, receives the at least three signals, the first reference signal, and the second reference signal. The second device identifies values for the at least three signals according to the first reference signal and the second reference signal.

5 Claims, 6 Drawing Sheets

METHOD AND APPARATUS FOR IMPLEMENTING HIGH SPEED SIGNALS USING DIFFERENTIAL REFERENCE SIGNALS

BACKGROUND OF THE INVENTION

1. Field of the Invention

The present invention relates generally to the field of computer systems. More specifically, the present invention relates to high-speed signaling processing.

2. Description of the Related Art

With rapidly development of processor technologies, a faster bus implementation is needed to transfer data or control signals between processor components. Typically, a system contains multiple buses including processor and system buses and generally the buses are slower components in the system. Thus, in order to optimize a high-speed performance processor, high-speed buses are typically required.

A first approach to improve bus performance is to employ conventional scheme of differential signaling bus. A problem with this approach is that the differential signaling bus requires two additional reference signals for each data signal. Thus, this approach increases bus wires by at least two times, and consequently consumes a large amount of power and chip space to operate the additional wires.

A second approach to improve bus speed is to use conventional scheme of differential signaling bus where the reference signals are generated locally. A problem with this approach is that most of the signal margins needed to trigger the sense amplifier may be lost at the receiving end because the power supplies for the driver and the power supplies for the receiver are located far apart. Thus, the signal margins for this approach are required to increase and, accordingly, more power is required to operate this approach.

SUMMARY OF THE INVENTION

A device contains a first device and a second device. In one embodiment, the first device drives at least three signals, a first reference signal, and a second reference signal. The second device, which is coupled to the first device, receives the at least three signals, the first reference signal, and the second reference signal. The second device identifies values for the at least three signals according to the first reference signal and the second reference signal.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
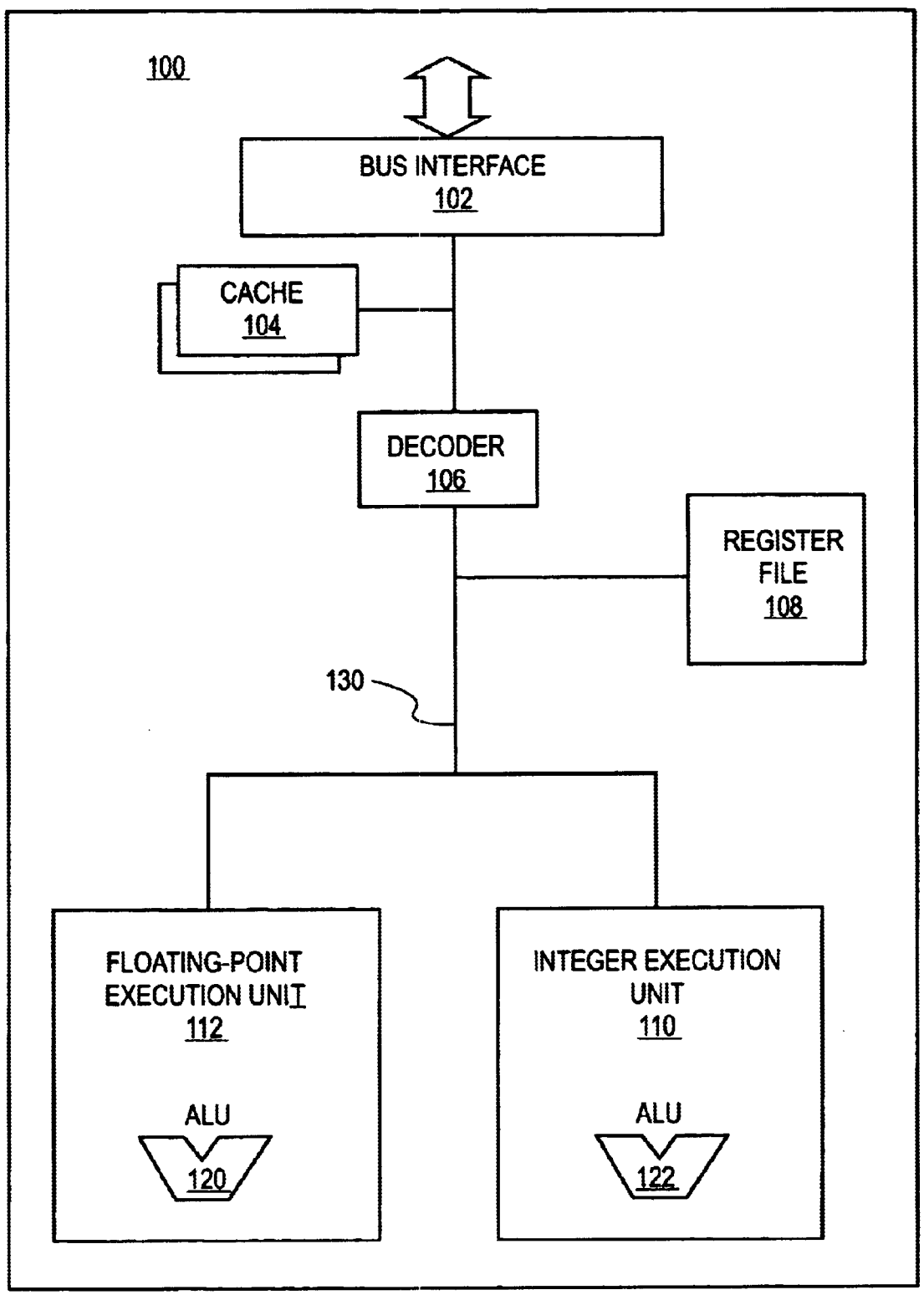
FIG. 1 is a block diagram of one embodiment of the processing unit.

A method and an apparatus for implementing high-speed signals using a mechanism of pseudo differential bus are described.

Numerous specific details are set forth in the following description in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise in the following discussions, it is appreciated that throughout the present invention, discussions utilizing terms such as "processing" or "computing" or "calculating" or "determining" or "displaying" etc. refer to the action and processes of a computer system, or similar electronic computing device. That is, a device that manipulates and transforms data represented as physical (electronic) quantities within the computer system's registers and memories into other data similarly represented as physical quantities within the computer system memories or registers, or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

A mechanism for high-speed signal implementation using differential reference signals is disclosed. In one embodiment, a driver sends multiple groups of signals to a receiver over a set of wires. Each group of signals contains a high reference signal, a low reference signal, and multiple signals, such as, for example, four data signals. When the receiver senses the multiple groups of signals, the receiver identifies logic values for each signal in response to the high and low reference signals. In one embodiment, the high and low reference signals are shared among four data signals.

In another embodiment, a group of wires carrying multiple signals, also known as a bus, is pre-charged and equalized during the pre-charge clock cycle. In this embodiment, the wires closer to the receiver end are pre-charged while the wires closer to the driver end are equalized. Using the circuit of pre-charge and equalization reduces bus set-up time and consequently, a higher clock frequency can be operated.

FIG. 1 is a block diagram of one embodiment of the processing unit 100. Processing unit 100 includes a bus interface 102, a cache 104, a decoder 106, a register file 108, a floating-point execution unit 112, and an integer execution unit 110. Of course, processing unit 100 may contain additional circuitry, which is not necessary to understanding the invention.

Integer execution unit 110, which further includes an integer arithmetic logic unit ("ALU") 122, is used for executing integer instructions received by processing unit 100. Integer execution unit 110 performs various data manipulations including storing, fetching, addressing, and integer calculations. Integer execution unit 110 is further coupled to floating-point execution unit 112. In one embodiment, integer execution unit 110 includes floating-point execution unit 112. Floating-point execution unit 112 includes a floating-point ALU 120 to perform floating-point arithmetic.

Integer execution unit 110 is coupled to a register file 108 via an internal bus 130. Register file 108 represents a storage area on processing unit 100 for storing information, including data. One embodiment of the register file 108 contains various special registers, such as machine specific registers, status registers, et cetera. Integer execution unit 110 is further coupled to a cache 104 and a decoder 106. Cache 104 is used to cache data and/or control signals. Decoder 106 is used for decoding instructions received by processing unit 100 into control signals and/or micro-code entry point. In response to these control signals and/or microcode entry point, integer execution unit 110 performs the appropriate operations. Decoder 106 may be implemented using any number of different mechanisms (e.g., a look-up table, a hardware implementation, etc.).

Bus interface 102 is used to communicate between processing unit 100 and the rest of the components in the system, such as main memories, input/output devices, and system bus. Other components may be included in processing unit 100, such as a second level cache. Processing unit 100, in one embodiment, is integrated into a single integrated circuit ("IC").

Figure 2:
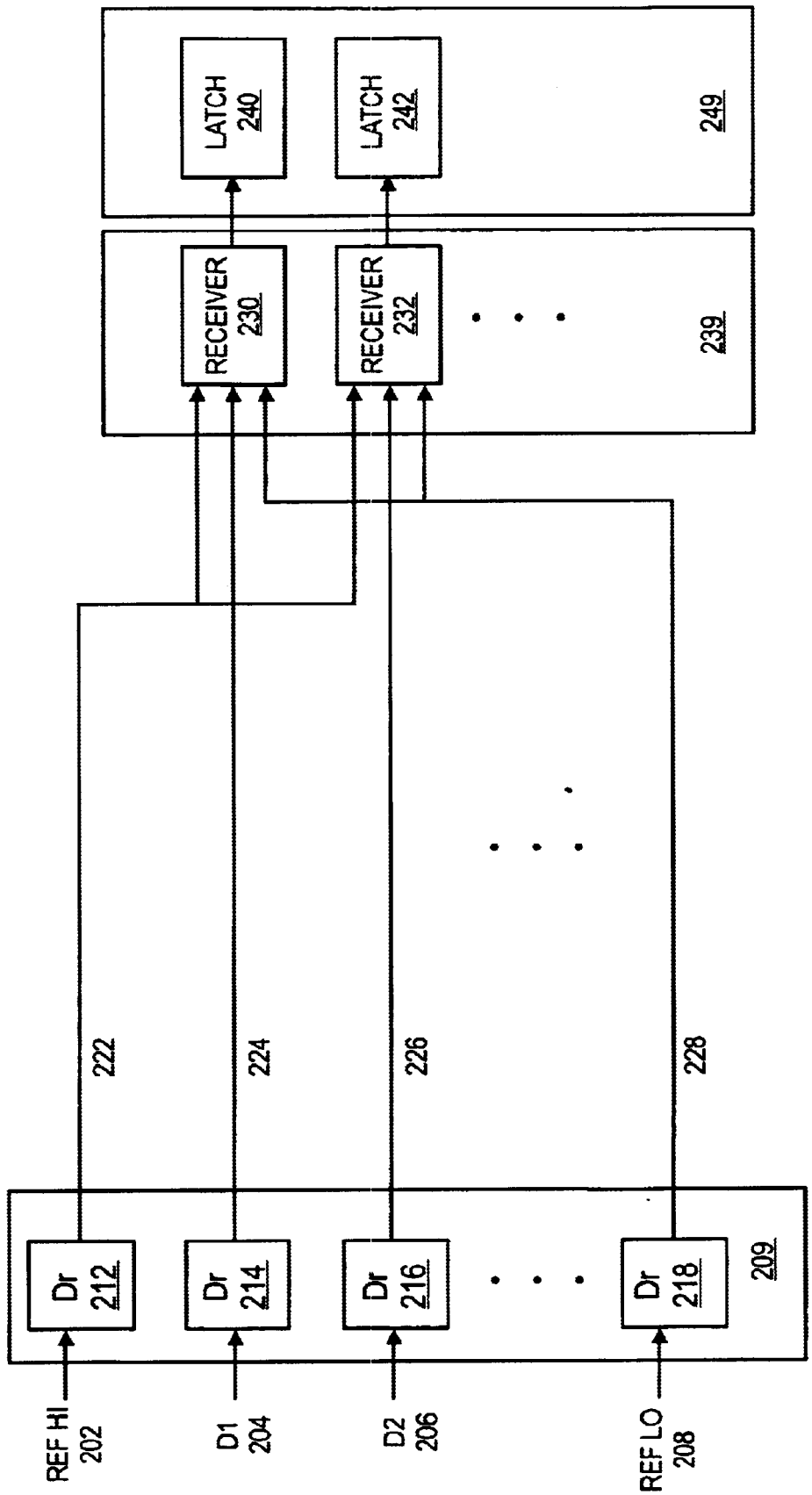
FIG. 2 is a bus block diagram illustrating one embodiment of a bus scheme.

FIG. 2 illustrates one embodiment of a bus scheme 200, where it includes a driver 209, a receiver 239, and a storage device 249. Driver 209 further includes multiple driver circuits 212, 214, 216 and 218. Receiver 239 also includes multiple receiver circuits 230, 232. Storage device 249 also contains latch circuit 240 and latch circuit 242. In one embodiment, driver 209, receiver 239, storage device 249, and multiple wires 222–228 may be integrated into a single integrated circuit. Other blocks may be included in block diagram 200, but they are not important to understanding the present invention.

In one embodiment, driver 209 receives multiple data signals and reference signals. The reference signals 202, 208 may be generated from power supplies. In another embodiment, the reference signals 202, 208 are generated by other components. When the high-reference signal 202 reaches to driver circuit 212, driver circuit 212 drives high-reference signal 202 onto a bus 222. Similarly, when the low-reference signal 208 reaches to driver circuit 218, the driver circuit 218 drives the low-reference signal 208 onto a bus 228. Driver circuit 214 receives data 204 and drives the data 204 onto a bus 224. Driver 216 receives data 206 and drives the data 206 onto a bus 226. Note that more data maybe received by driver 209, and more data maybe driven onto the data buses.

In one embodiment, driver 209 drives four data signals and two reference signals. In this embodiment, driver circuit 212–218 are source follower drivers because the driver circuits 212–218 only need to drive signals a few hundred millivolts to be triggered by the sensor amplifiers. An advantage to using the source follower driver is efficient driving strength with low voltage swings. Thus, using the source follower driver reduces power consumption. Another advantage for using the source follower driver is to receive input signals from dynamic circuit or from another sense amplifier, which will be discussed later.

In one embodiment, receiver 239 contains six receiver circuits where two receiver circuits are used to receive the high and low reference signals and other four receiver circuits are dedicated to receive data signals. In another embodiment, receiver circuit 230 is a P-sense amplifier receiver and is configured to sense a logical value of the data signal using the reference signals from buses 222 and 228. Due to the use of the reference signals, the receiver circuit can identify the logic value of a signal with a few hundred millivolts instead of 1.5 volts, which is, in one embodiment, the full voltage level for representing a logic 1 value. For example, receiver circuit 230 senses a logic value 1 if the signal on bus 224 is 105 millivolts while the low reference signal is 5 millivolts. Also, receiver circuit 232 senses a logic value 0 if the signal on bus 226 is 10 millivolts while the high reference signal is 100 millilivolts. Since the buses 222–228 carry relatively small amount of charge or current, the wire pitch size for the bus can be reduced. Pitch size is measured from the width of a wire plus the width of the insulator. Moreover, the common mode noise rejection within the bus is also enhanced due to small pitch size and the high and low reference signals.

In one embodiment, storage device 249 contains multiple latch circuits 240–242. In another embodiment, latch circuits 240 and 242 can be static latches. Storage device 249 latches data from receiver 239 and stores the data for the next clock cycle.

In one operation, driver 209 receives reference signals 202, 208 and data signals 204, 206. After completion of receipt, driver 209 drives the data signals and reference signals onto the bus. For example, driver circuit 212 receives high reference signal 202 and subsequently drives high reference signal 202 onto the bus 222. In one embodiment, bus 222 is 9,000 microns in length without repeaters in between. Repeater is a circuit to re-power signals. When receiver 239 receives the signals, receiver circuits identify the logic value for each data signal according to the high and low reference signals. Note that block diagram 200 may contain more than four data signals.

Figure 3:
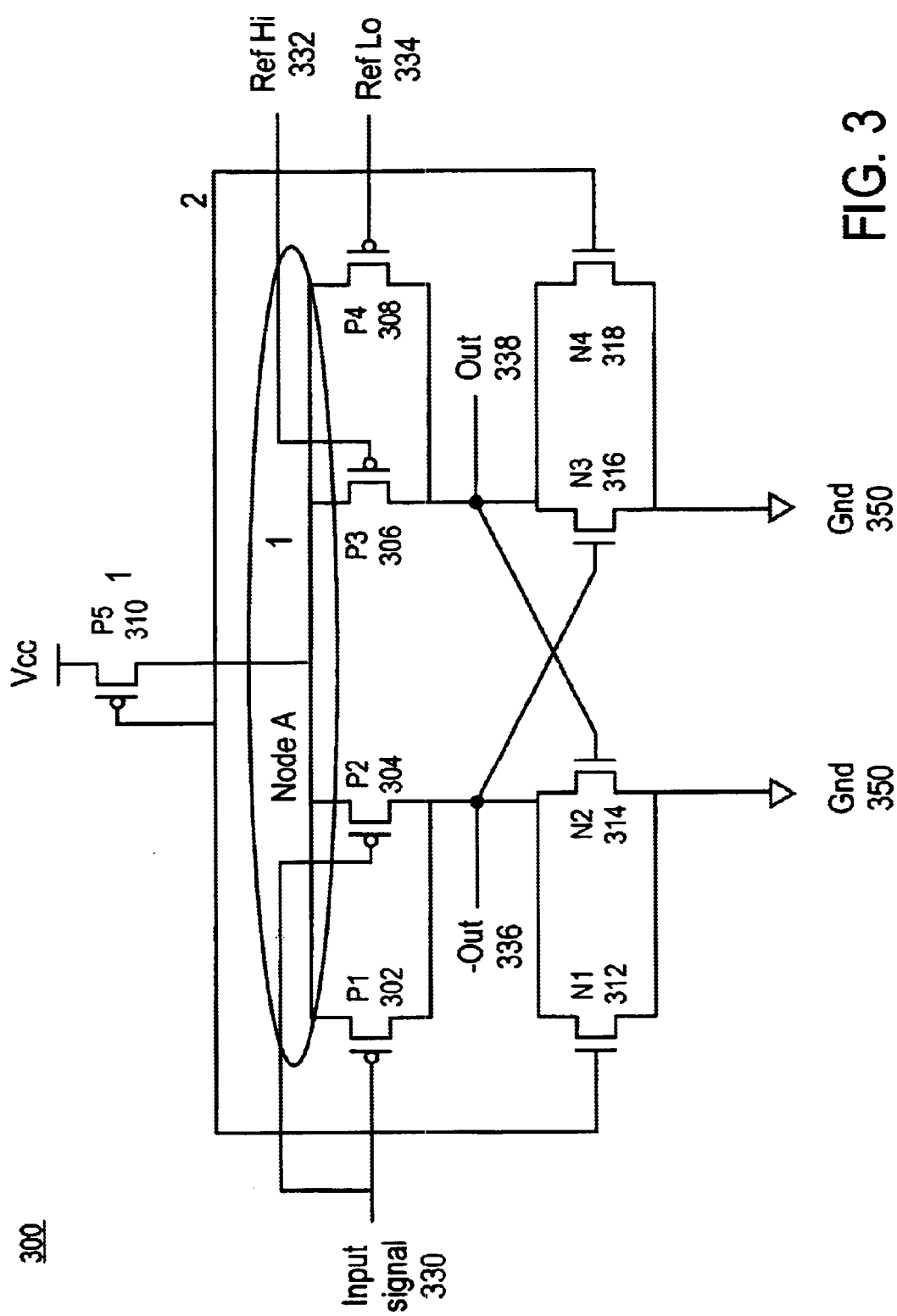
FIG. 3 illustrates one embodiment of a sensing device.

FIG. 3 is a circuit diagram 300 illustrating one embodiment of a sensing device. In one embodiment, circuit diagram 300 is a P-sense amplifier receiver and it contains P-MOS ("Metal Oxide Semiconductor") P1–P5, 302–310, respectively, and N-MOS N1–N4, 312–318, respectively. P5 310, N2 312, and N3 318 are used to perform pre-charge functions. N2 314 and N3 316 are dedicated to output functions. P1 302 and P2 304 are used to receive data or control signals while P3 306 and P4 308 are dedicated to receive reference signals. In one embodiment, P1 302, P2 304, P3 306, and P4 308 are similarly sized transistors.

In one embodiment, while the source terminal of P5 310 is coupled to Vcc power supply, the drain terminal of P5 310 is coupled to node A. The gate terminal of P5 310 is coupled to gate terminal of N1 312 and the gate terminal of N4 318. In one embodiment, the gate terminal of P5 310 is also connected to a pre-charged clock. While the source terminals of P1 302 and P2 304 are coupled to node A, the drain terminals of P1 302 and P2 304 are coupled to the complement output 336. The gate terminals of P1 302 and P2 304 are coupled to input signal 330.

Also, the source terminals P3 306 and P4 308 are coupled to node A and the drain terminals P3 306 and P4 308 are coupled to the output terminal 338. While the gate terminal of P3 306 is coupled to the high reference signal 332, the gate terminal of P4 308 is coupled to the low reference signal 334. While the gate terminal of N2 314 is coupled to the output 338, the gate terminal of N3 316 is coupled to the complement output 336. The source terminals of N1 312 and N2 314 are connected to the ground power supply 350 and the drain terminals of N1 312 and N2 314 are coupled to the complement output 336. The source terminals of N3 316 and N4 318 are connected to the ground power supply 350 and the drain terminals of N3 316 and N4 318 are coupled to the output 338.

In one operation, when input signal is a logic 1, P1 302, P2 304, and P3 306 are off. Since the low reference signal 334 is low, which turns on P4 308, the output 338 produces logic 1. Since output 338 is logic 1, N2 314 is on, which drives complement output 336 to zero. When complement output 336 is zero, it turns off N3 316. Thus, when input signal is a logic 1, the output 338 outputs a logic 1.

On the other hand, if input signal is a logic 0, P1 302, P2 304, and P4 308 are all on at the same time. When P1 302 and P2 304 are both on at the same time, N3 316 is driven to be on faster than N2 314 to be turned on. When in one embodiment N3 316 can drain more current than N2 314, the output 338 is driven to a logic 0. When the output 338 is at logic 0, N2 314 is off and subsequently the complement output 336 is at logic 1. Thus, when input signal 330 is a logic 0, the output 338 is also a logic 0. Note that a N-sense amplifier receiver can be derived from circuit diagram 300 by replacing P-MOS with N-MOS and replacing N-MOS with P-MOS.

Figure 4:
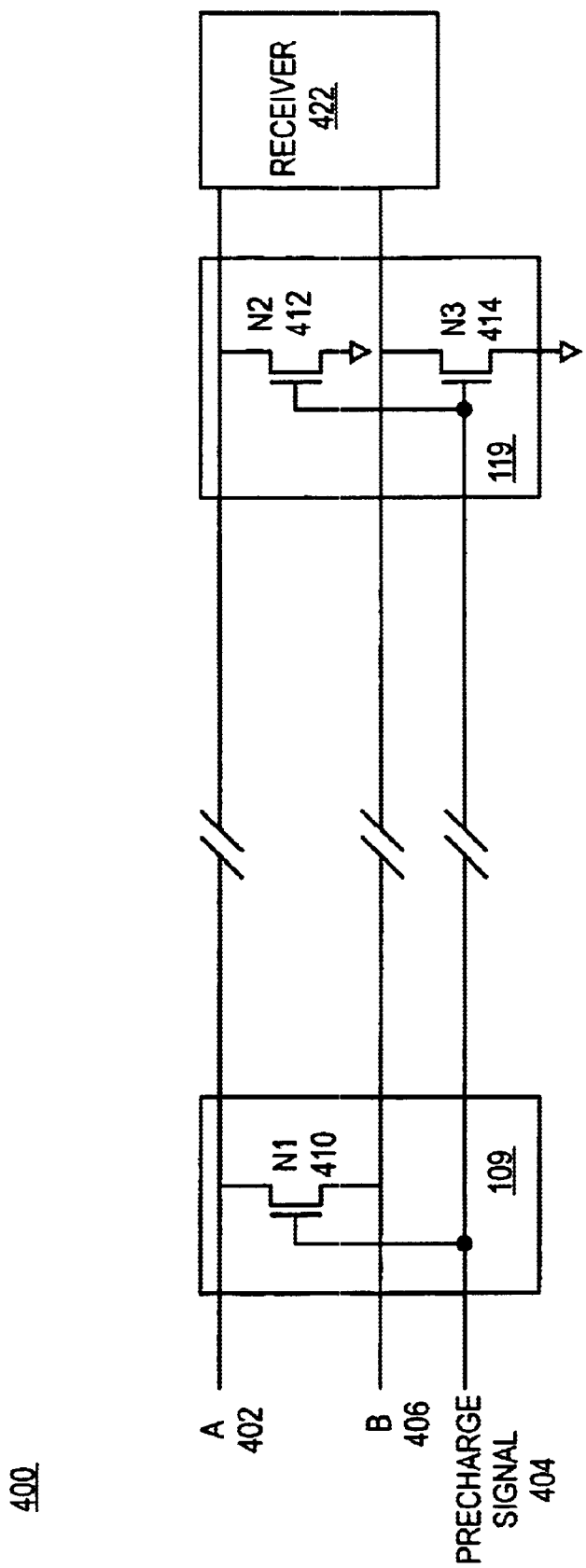
FIG. 4 is a block diagram illustrating one embodiment of a bus configuration with pre-charge and equalizer circuits.

FIG. 4 is a block diagram 400 illustrating one embodiment of a bus configuration with pre-charge and equalizer circuits. Block diagram 400 contains an equalizer circuit 109, a pre-charge circuit 119, and a receiver 422. Block diagram 400 also contains bus A 402 and bus B 406 where bus A 402 and bus B 406 are driven by a driver (not shown). In one embodiment, receiver 422 is a sense amplifier receiver. Other components may be added to block diagram 400, but they are not important to understanding the disclosed system.

In one embodiment, equalizer circuit 109 contains an N-type transistor such as an N-MOS transistor. However, if an additional bus is added in block diagram 400, at least one more transistor may be required in equalizer circuit 109. Moreover, the N-type transistor N1 410 of equalizer circuit 109 may be replaced with a P-type transistor if the plurality of the pre-charge signal 404 is changed. In another embodiment, pre-charge circuit 119 contains two N-type transistors N2 412 and N3 414. However, if an additional bus is added in block diagram 400, one or more N-type transistors may be required in pre-charge circuit 119 to perform the pre-charge function.

In one embodiment, equalizer circuit 109 is placed closer to the driver's side of the bus while pre-charge circuit 119 is placed closer to the receiver's side of the bus for conserving power consumption. Referring back to FIG. 4, the buses are initially charged at the driver side's side and the charge is propagated from the driver's side of the bus to the receiver's side of the bus. Since the driver's side of the bus contains higher voltage levels than bus at the receiver's side, using equalizer circuit 109 closer to the driver's side of bus saves or recycles a large amount of power. Thus, in one embodiment the equalizer circuit 109 does not discharge the charge, but equates the charge between the bus wires.

In one operation, the bus at the receiver end is pre-charged and the bus at the driver's side is equalized before the driver starts driving the bus. Equalizer circuit 109 may be repeated if the bus is long. Since the charge on the buses is not directly discharged on the driver end, a large amount of power is saved and the speed of the bus is improved due to less load on the bus.

Figure 5:
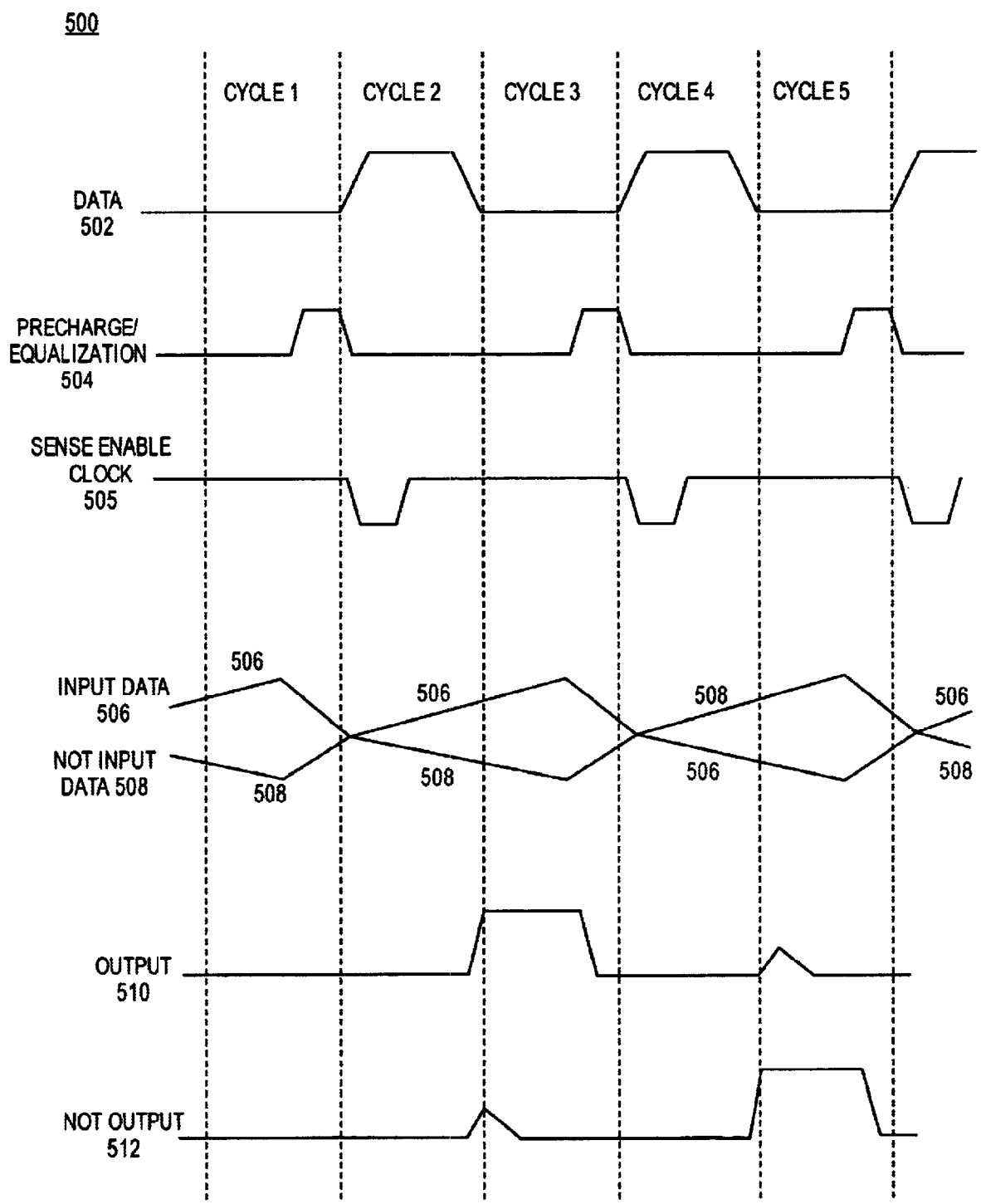
FIG. 5 is a timing diagram illustrating an embodiment of a process for implementing the pseudo differential bus scheme.

FIG. 5 is a timing diagram 500 illustrating an embodiment of a process for implementing pseudo differential bus scheme. Timing diagram 500 illustrates five clock cycles where clock cycle 1, 3, and 5 are pre-charged clock cycles and cycles 2 and 4 are data enabled clock cycles. Timing diagram 500 further illustrates a data signal 502, a pre-charge and equalization signal 504, a sense enable clock 505, an input data signal 506, a complement input data signal 508, an output signal 510, and a complement output signal 512.

Input data 506 and the complement input data 508 are pre-charged at the falling edge of the pre-charge and equalization cycle 504. At the rising edge of the pre-charge and equalization cycle 504, in one embodiment input data 506 and the complement input data 508 are charged to voltage levels where a sensing amplifier can detect a logic value from the voltage levels. In one embodiment, sense enable clock 505 is a sense amp enable clock, which is used to indicate when the data is sampled.

The output signal 510 changes from logic 0 to logic 1 at the beginning of the clock cycle 3 and changes from logic 1 to logic 0 during the pre-charge and equalization cycle 504. In this embodiment, when input data 506 is high, output 510 is also high. If input data 506 is logic 0, output 510 is also logic 0. The complement output 512 is the inverse logic value of output 510. Other signal waive forms may be added in the timing diagram, but they are not important to understanding the disclosed diagram.

Figure 6:
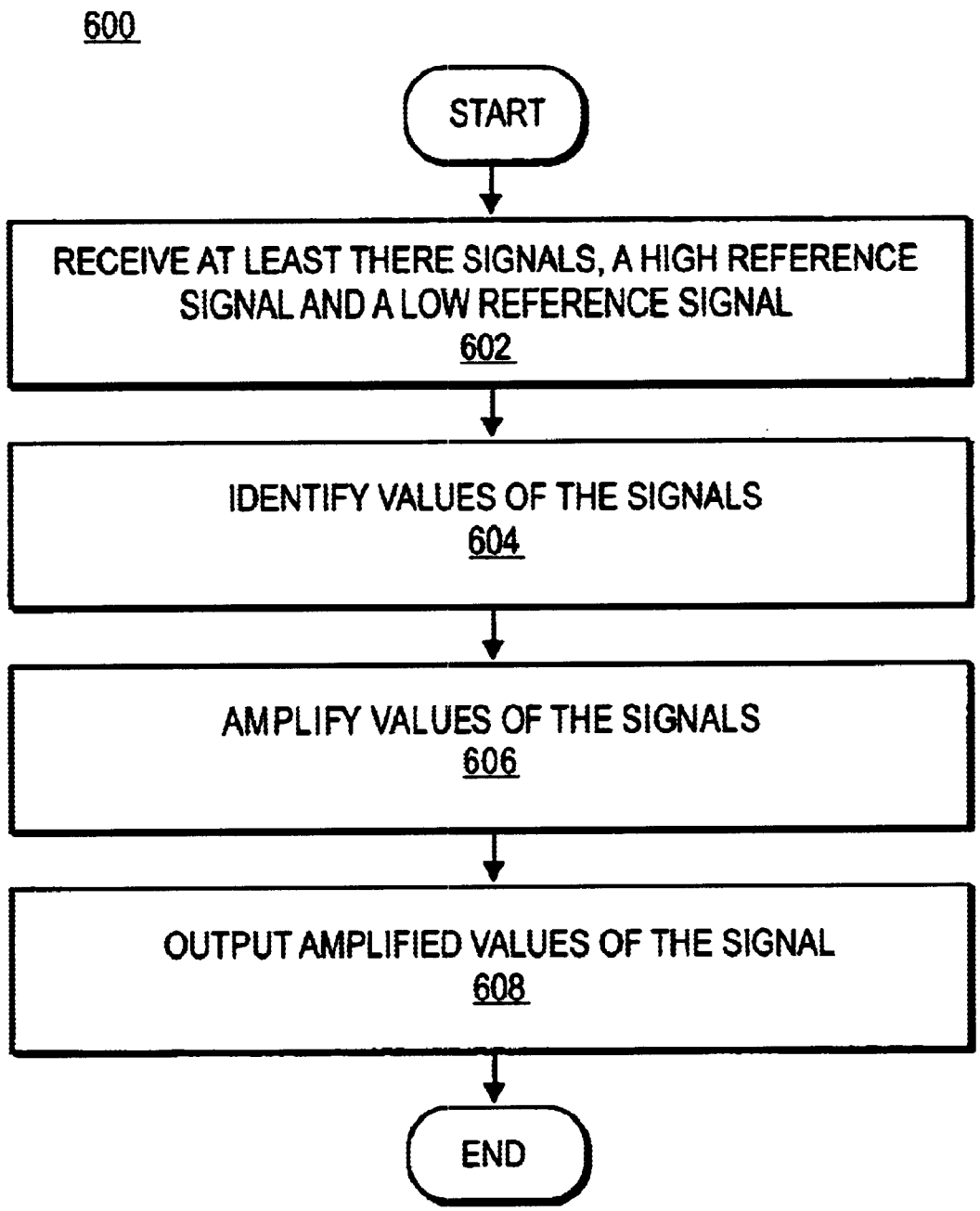
FIG. 6 is a flowchart illustrating an embodiment of a process for implementing the pseudo differential bus scheme.

FIG. 6 is a flowchart 600 illustrating an embodiment of a process for implementing the pseudo differential bus scheme. The process begins at start block and proceeds to block 602. At block 602, the process receives at least three signals, a high reference signal, and a low reference signal. In one embodiment, the signals are data signals. In an alternative embodiment, the signals are control signals. After block 602, the process proceeds to block 604, where the process identifies the value of the data in response to the high reference signal and the low reference signal. After block 604, the process proceeds to block 606. At block 606, the values of the data signals are amplified before they are latched by the storage device. After block 606, the process proceeds to block 608 where the process outputs amplified values of the signal and the outputs are stored in the storage device. After block 608, the process ends.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

Thus, a method and a system for implementing high-speed signals using a pseudo differential bus mechanism have been described.

I claim:

1. A system comprising:
   a first device having a plurality of wires for transporting signals;
   a second device coupled to the first device to perform a pre-charge function at a receiving end of the first device;
   a third device coupled to the first device to equalize potentials between the plurality of wires at a driving end of the first device; and
   a receiver coupled to the receiving end of the first device to receive the signals across the plurality of wires, the receiver including a sensing amplifier to receive a first reference signal, and a second reference signal.

2. The system of claim 1, further comprising a driver coupled to the driving end of the first device and configured to drive the signals onto the plurality of wires.

3. The system of claim 1, wherein the first reference signal is a high reference signal and the second reference signal is a low reference signal.

4. The system of claim 1, wherein the second device is a pre-charge circuit and the third device is an equalizer circuit.

5. A system comprising:
   a first device configured to drive at least three signals, a first reference signal, and a second reference signal onto a plurality of wires;
   a second device coupled to the first device and configured to receive the at least three signals, the first reference signal, and the second reference signal from the plurality of wires, the second device further configured to identify values for the at least three signals according to the first reference signal and the second reference signal;
   a third device coupled to the second device and configured to perform a pre-charge function on the plurality of wires closer to receiving end of the second device; and
   a fourth device coupled to the first device and configured to perform a equalizer function on the plurality of wires closer to driving end of the first device.

* * * * *